US007789353B2

(12) United States Patent

Koerlin et al.

(10) Patent No.: US 7,789,353 B2
(45) Date of Patent: Sep. 7, 2010

(54) ROTOHAMMER SUPPORT AND ACTUATION DEVICE

(75) Inventors: William Koerlin, Oakland, CA (US); Todd Koerlin, Castro Valley, CA (US)

(73) Assignee: Phyllis Koerlin, Castro Valley, CA (US)

( * ) Notice: Subject to any disclaimer, the term of this patent is extended or adjusted under 35 U.S.C. 154(b) by 120 days.

(21) Appl. No.: 12/331,527

(22) Filed: Dec. 10, 2008

(65) Prior Publication Data

US 2010/0140445 A1 Jun. 10, 2010

(51) Int. Cl.
*A47F 5/00* (2006.01)
*B23Q 5/00* (2006.01)

(52) U.S. Cl. ............................. 248/122.1; 248/295.11; 248/241; 408/136; 173/141

(58) Field of Classification Search ............. 248/122.1, 248/121, 125.1, 125.2, 125.3, 125.8, 407, 248/410, 411, 159, 157, 295.11, 241, 235, 248/297.21, 297.31, 297.51; 408/136, 234, 408/712, 99; 173/170, 30, 36, 141; 227/156
See application file for complete search history.

(56) References Cited

U.S. PATENT DOCUMENTS 2,405,110 A * 8/1946 Bullock ...................... 173/141
2,879,677 A * 3/1959 Baublitz ..................... 173/141
2,889,723 A * 6/1959 Morrell ...................... 173/141
2,947,204 A * 8/1960 Pine et al. ................... 173/141
4,442,905 A * 4/1984 Agoston ...................... 173/36
4,736,804 A * 4/1988 Geibel ......................... 173/30
5,244,048 A * 9/1993 Moorhead, Sr. ............. 173/141
5,295,620 A * 3/1994 Cousineau et al. .......... 227/156
5,322,397 A * 6/1994 Spear .......................... 408/99
5,820,317 A * 10/1998 Van Troba .................. 408/136
6,095,724 A * 8/2000 Hurt ........................... 408/136

FOREIGN PATENT DOCUMENTS

FR 2750628 A1 * 1/1998

* cited by examiner

*Primary Examiner*—Anita M King
(74) *Attorney, Agent, or Firm*—Bay Area Technology Law Group PC

(57) ABSTRACT

A device for the support and linear movement of a rotohammer. The device includes an elongated shaft, pole or rail having a first end, and a second end, the latter proximate to an object to be drilled and having a longitudinal axis. An L-shaped bracket is provided having a first leg slidably mounted on the elongated shaft, pole or rail along its longitudinal axis and a second leg projecting perpendicularly from the first leg, the L-shaped bracket being sized to receive and support the rotohammer. A handle is pivotable on the elongated shaft, pole or rail and a linkage bridging the handle and L-shaped bracket is movable by movement of the handle such that in moving the handle from a first at rest position to a second position, the L-shaped bracket is caused to move along the elongated shaft, pole or rail toward its second end for extending the rotohammer in the direction of the object to be drilled.

9 Claims, 3 Drawing Sheets

ROTOHAMMER SUPPORT AND ACTUATION DEVICE

TECHNICAL FIELD

The present invention deals with a bracket for supporting and actuating a rotohammer, particularly useful in drilling overhead objects where the weight and torque of the rotohammer makes such drilling operations tedious and prone to injury.

BACKGROUND OF THE INVENTION

Rotohammers are, in effect, large hammer drills which are often employed in the drilling of concrete and steel supports for a variety of applications. Pipe workers employ rotohammers during construction and retrofitting of structures such as in the application of seismic supports in commercial buildings.

Rotohammers may be used to drill holes of up to a maximum of approximately 2½" (7 cm) in diameter. In masonry oftentimes, the rotohammer can contact rebar which can catch inside the bit threads and can cause the rotohammer to twist. Rotohammers produce considerable torque and they often weigh more than 10 kg so that, between the weight of a rotohammer and the torque which can be applied to a user, overhead drilling operations can be very tedious and can cause injury to even the most skilled operator.

It is thus an object of the present invention to provide a device capable of supporting a rotohammer and moving it into position to drill an intended substrate through linear movement and to maintain the drill bit in contact with the substrates while obviating the need for an operator to support the rotohammer during the drilling operation.

These and further objects may be more readily apparent when considering the following disclosure and appended claims.

SUMMARY OF THE INVENTION

A device for the support and linear movement of a rotohammer. The device includes an elongated shaft, pole or rail having a first end, and a second end, the latter proximate to an object to be drilled and having a longitudinal axis. An L-shaped bracket is provided having a first leg mounted on the elongated shaft, pole or rail along its longitudinal axis and a second leg projecting perpendicularly from the first leg, the L-shaped bracket being sized to receive and support the rotohammer. A handle is pivotable on the elongated rail and a linkage bridging the handle and L-shaped bracket is movable by movement of the handle such that in moving the handle from a first at rest position to a second position, the L-shaped bracket is caused to move along the elongated shaft, pole or rail toward its second end for extending the rotohammer in the direction of the object to be drilled.

DETAILED DESCRIPTION OF THE INVENTION

Figure 1:
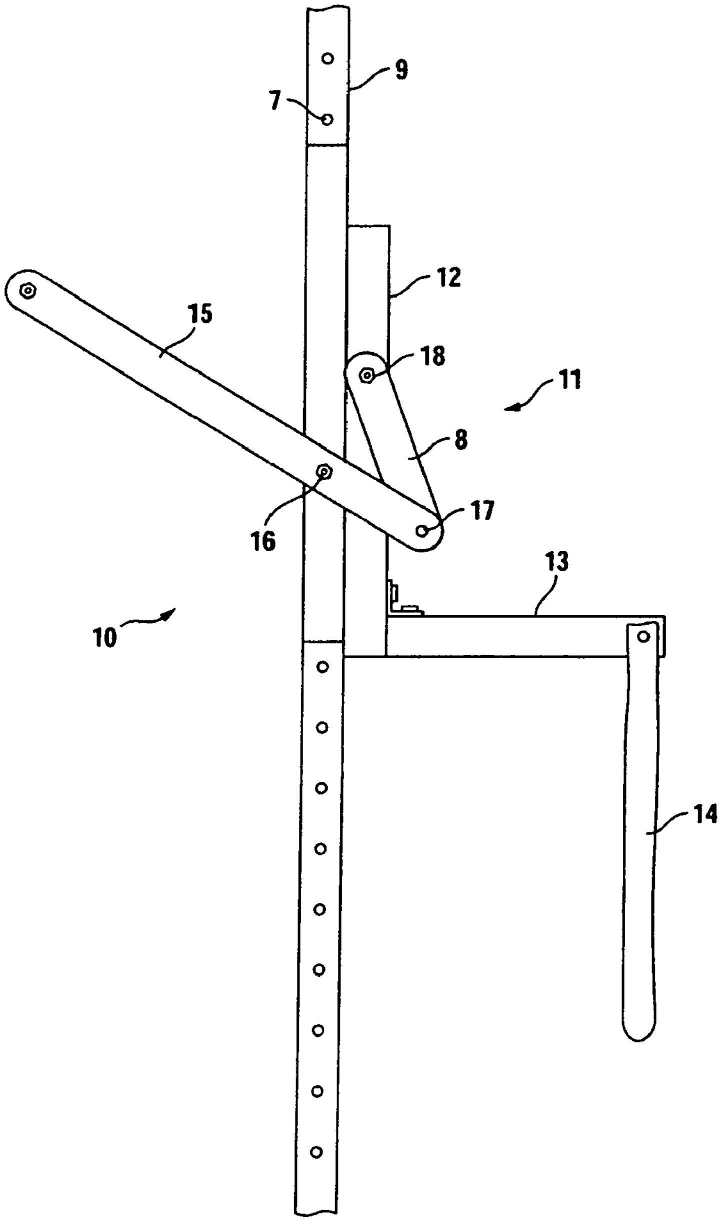
FIG. 1 is a side view of a portion of the device of the present invention showing its various elements in detail.
Figure 3:
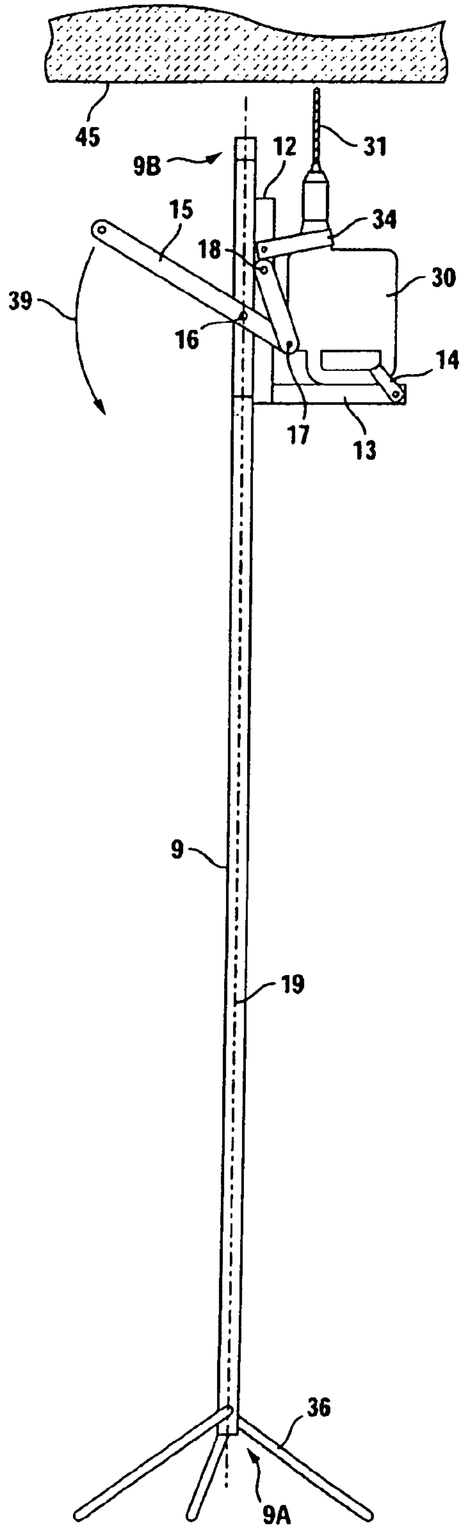
FIG. 3 is a side view of the overall device including the detailed portion depicted in FIGS. 1 and 2.
Figure 4:
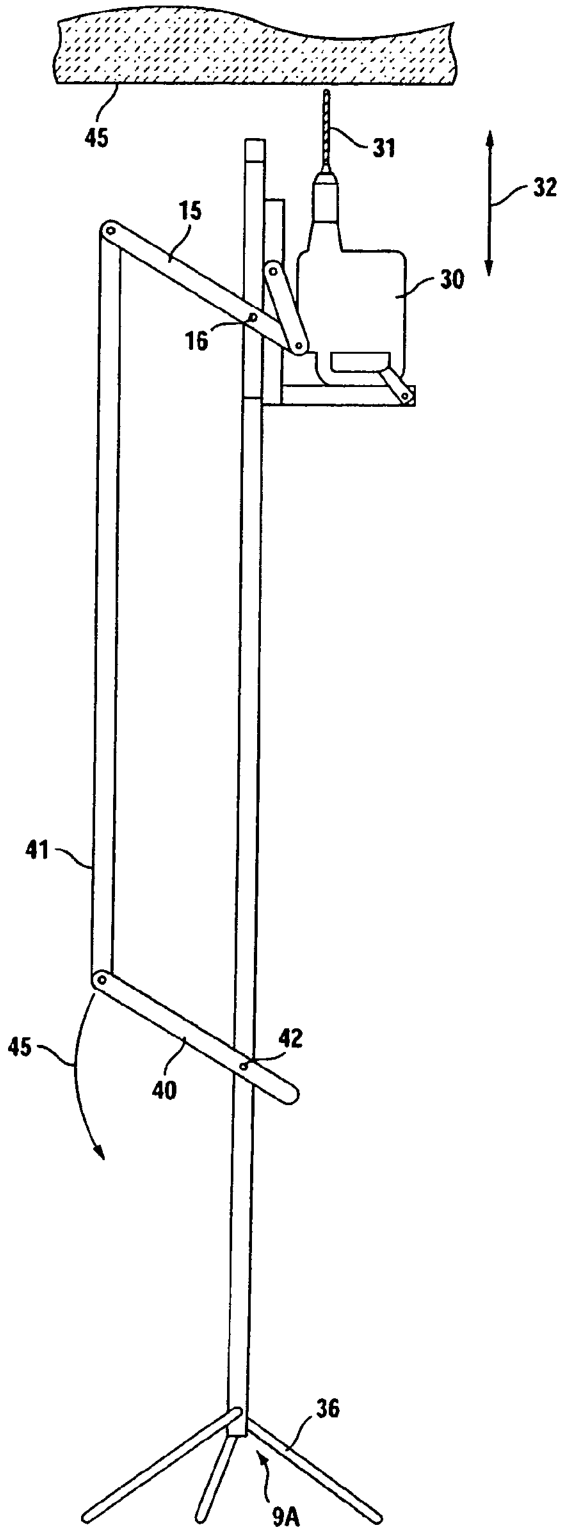
FIG. 4 is a side view of the device of the present invention including its preferred embodiment.

Turning first to FIG. 1, device 10 is depicted for the support and linear movement (arrows 32, FIG. 3) of a rotohammer (element 30 of FIGS. 3 and 4).

Device 10 comprises an elongated rail 9 composed of, for example, an extruded steel or aluminum rail of sufficient mill thickness to support the rotohammer and to resist torque grab that may be imposed upon rail 9 in the event that bit 31 confronts rebar or other steel obstacle during the overhead drilling within overhead element 45. Elongated rail 9 has first end 9A and second end 9B, the latter proximate overhead element 45 to be drilled. Elongated rail 9 is further characterized as being situated along longitudinal axis 19 generally extending vertically from base 36, preferably in the nature of a tripod, to second end 9B as best shown in FIG. 3.

The present device further comprises L-shaped bracket 11 having first leg 12 slidably mounted on said elongated rail 9 along its longitudinal axis 19 and second leg 13 projecting substantially perpendicularly from first leg 12, said L-shaped bracket being sized to receive and support rotohammer 30.

Figure 2:
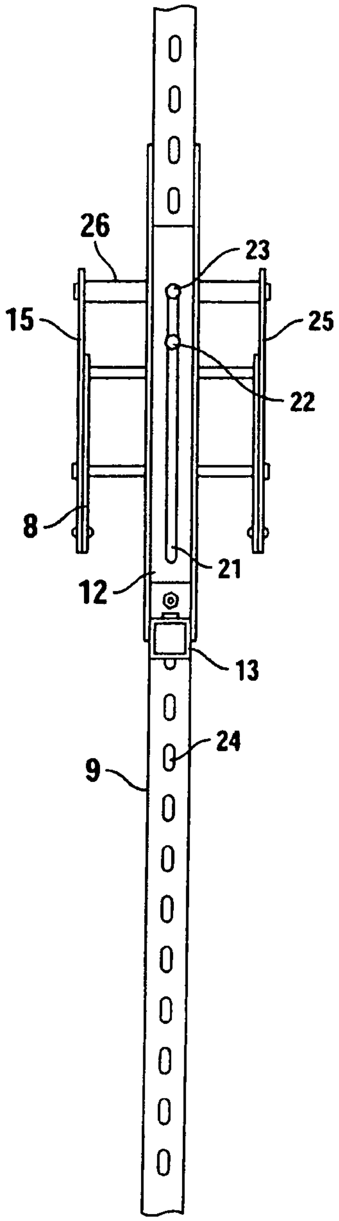
FIG. 2 is a front view of the device depicted in FIG. 1.

A handle 15 is pivotable at axis 16 on elongated rail 9 and connects to linkage arm 8 along pivot point 17, linkage arm 8 being connected to L-shaped bracket 11 at its first leg 12 at pivot point 18. As noted in reference to FIG. 2, handles 15 and 25 are located on either side of elongated rail 9 joined, by connector 26 to provide appropriate parallelogram support for movement of L-shaped bracket 11 linearly in the direction of arrows 32.

L-shaped bracket 11 can be situated virtually anywhere along rail 9. Obviously, placement should be established such that upon moving connector 26 downwardly, L-shaped bracket 11 would rise sufficiently to enable drill bit 31 to confront its intended substrate. Ideally, the first leg 12 of L-shaped bracket 11 includes elongated slot 21 which receives projections 22 and 23, ideally in the form of bolts releasably secured to openings 24 within elongated rail 9. Quite clearly, projections 22 and 23 can be moved virtually anywhere along elongated rail 9 to position L-shaped bracket 11 appropriately. A plurality of spaced openings 7 configured within elongated rail 9 are also provided to enable pivot 16 to change locations along longitudinal axis 19 as L-shaped bracket 11 is repositioned. In actuating this device, connector 26 is provided for convenient gripping by an operator.

Turning to FIG. 3, tripod base 36 is provided for stabilizing elongated rail 9 and its supporting structure. Strap 14 can be included for connecting the handle portion of rotohammer 30 to second leg 13 of L-shaped bracket 11 while a second strap 34 can simply be wrapped about another portion of rotohammer 30, such as near its drill chuck for connection to first leg 12 of L-shaped bracket 11. Moving lever 15 downwardly in a direction of arrow 39 causes rotohammer 30 to move in the direction of overhead element 45 linearly in the direction of arrow 32. Thus, during drilling operations, the operator need only press down upon connector 26 and need not support the relatively heavy rotohammer above his head thus minimizing fatigue and potential injury in the event that drill bit 31 confronts a binding surface which is not adequately addressed by the chuck clutch of the device.

As a further embodiment, reference is made to FIG. 4. As background, it must be appreciated that in drilling overhead element 45, oftentimes, a ladder is required to actuate lever arm 15. Because of the weight and torque inherent in the use of rotohammers, the risk remains that elongated rail 9 may cause an associated ladder to tip thus increasing the risk to an operator. In minimizing this risk, handle 40 can be provided at, for example, the arm level of an operator standing on a support surface proximate base 36. In moving handle 40 in the direction of arrow 45, linkage 41 can act upon lever handle 15. Thus, as handle 40 moves about pivot 42, handle 15 moves about pivot 16 thus moving rotohammer 30 linearly in the direction of arrows 32 in order to enable drill bit 31 to confront overhead element 45.

Figure 5A:
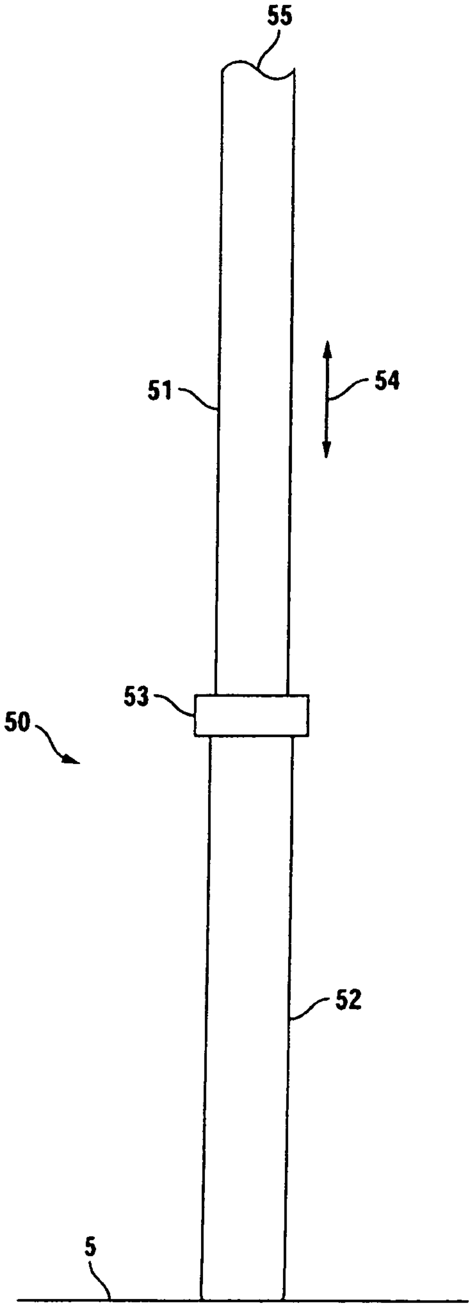
FIGS. 5A and 5B are side plan views of partial sections of pole pieces useful in practicing the present invention.
Figure 5B:
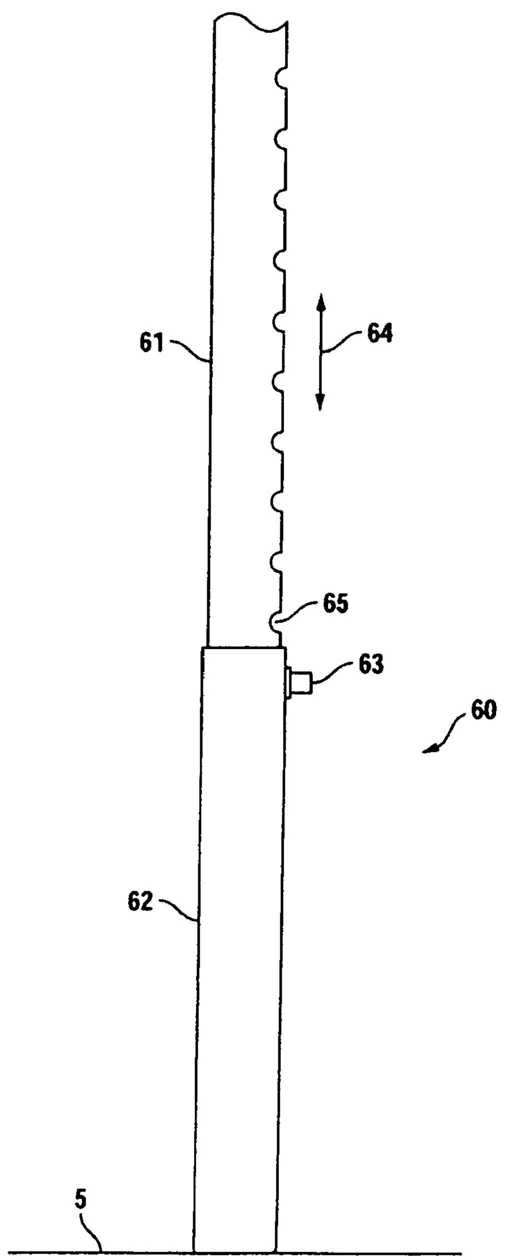

As further embodiments, reference is made to FIGS. 5A and 5B. As the thrust of the present application is to situate a rotohammer proximate an overhead element, it is necessary to position the drill bit of the rotohammer proximate the element prior to moving the above-described linkage and commencing the drilling operation. Further, it is contemplated that the present invention be used in environments where tripod support 36 could not be employed, such as on the platform of a scissor extension. In this regard, reference is made to FIGS. 5A and 5B.

Turning first to FIG. 5A, support pole 50 is shown having receiving element 52 being supported on ground or platform 5. Screw collar 53 can be employed which, once loosened, enables element 51 to telescope into and out of receiving element 52 in the direction of arrows 54. It is contemplated that end 55 would receive the rotohammer and supporting structure as described previously whereby upper element 51 would extend from lower receiving element 52 to position the drill bit of the rotohammer proximate an overhead element whereupon collar 53 would be tightened to fix the length of pole 50 whereupon drilling would begin as the rotohammer is further embedded into the overhang through the use of the linkage described above.

As an alternative to FIG. 5A, reference is made to FIG. 5B whereupon pole 60 is in the form of lower receiving element 62 again residing upon platform or flooring 5. Upper element 61 which supports the rotohammer and associated hardware contains a series of regularly spaced holes or indents 65 which releaseably mate with protrusion 63. In doing so, upper element 61 can be caused to "click" along its entire length depending upon which indent or opening 65 mates with protrusion 63. This enables upper element 61 to move up or down in the direction of arrow 64 as the height of the overhang determines the length of pole 60 to position the drill bit of a suitable rotohammer as described.

What is claimed is:

1. A device for the support and linear movement of a rotohammer, said device comprising an elongated shaft, pole or rail having a first end, a second end, the second end proximate to an object to be drilled and having a longitudinal axis, an L-shaped bracket having a first leg slidably mounted on said elongated shaft, pole or rail along its longitudinal axis and a second leg projecting substantially perpendicularly from said first leg, said L-shaped bracket being sized to receive and support said rotohammer, a handle pivotable on said elongated shaft, pole or rail and a linkage bridging said handle and L-shaped bracket and being movable by movement of said handle such that in moving said handle from a first at rest position to a second position, said L-shaped bracket is caused to move along said elongated shaft, pole or rail toward the second end thereof for extending said rotohammer in the direction of an object to be drilled and wherein said first leg of said L-shaped bracket comprises a section of rectangular stock having an elongated slot therein and at least two projections emanating from said elongated shaft, pole or rail positioned to pass within said elongated slot.

2. The device of claim 1 further comprising a strap for securing said rotohammer to said L-shaped bracket.

3. The device of claim 1 wherein said elongated shaft, pole or rail extends vertically for application of said rotohammer to an overhead object.

4. The device of claim 1 wherein said projections are positionable to multiple locations along said longitudinal axis.

5. The device of claim 1 wherein said handle is pivotable from a location remotely located from said second end of said elongated shaft, pole or rail.

6. The device of claim 1 herein said shaft, pole or rail comprises a lower segment and upper segment, said upper and lower segments telescoping with respect to one another to enable the length of said shaft, pole or rail to be adjusted.

7. A device for the support and linear movement of a rotohammer, said device comprising an elongated shaft, pole or rail having a first end, a second end, the second end proximate to an object to be drilled and having a longitudinal axis, an L-shaped bracket having a first leg slidably mounted on said elongated shaft, pole or rail along its longitudinal axis and a second leg projecting substantially perpendicularly from said first leg, said L-shaped bracket being sized to receive and support said rotohammer, a handle pivotable on said elongated shaft, pole or rail and a linkage bridging said handle and L-shaped bracket and being movable by movement of said handle such that in moving said handle from a first at rest position to a second position, said L-shaped bracket is caused to move along said elongated shaft, pole or rail toward the second end thereof for extending said rotohammer in the direction of an object to be drilled and further comprising at least two straps, a first releasably securing said rotohammer to said first leg and a second releasably securing said rotohammer to said second leg of said L-shaped bracket.

8. The device of claim 7 wherein said elongated shaft, pole or rail extends vertically for application of said rotohammer to an overhead object.

9. The device of claim 7 wherein said handle is pivotable from a location remotely located from said second end of said elongated shaft, pole or rail.

* * * * *